United States Patent
Holman et al.

(10) Patent No.: US 11,924,637 B1
(45) Date of Patent: Mar. 5, 2024

(54) AUTOMATIC IN-STORE SUBSCRIBER DEVICE DETECTION AND PROCESSING

(71) Applicant: T-Mobile Innovations LLC, Overland Park, KS (US)

(72) Inventors: Jacob Holman, Bonney Lake, WA (US); Ravikiran Sindogi, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 227 days.

(21) Appl. No.: 17/486,483

(22) Filed: Sep. 27, 2021

(51) Int. Cl.
| | |
|---|---|
| *H04W 12/06* | (2021.01) |
| *H04W 4/021* | (2018.01) |
| *H04W 8/18* | (2009.01) |
| *H04W 12/64* | (2021.01) |
| *H04W 84/12* | (2009.01) |

(52) U.S. Cl.
CPC ......... *H04W 12/068* (2021.01); *H04W 4/021* (2013.01); *H04W 8/18* (2013.01); *H04W 12/64* (2021.01); *H04W 84/12* (2013.01)

(58) Field of Classification Search
CPC ..... H04W 12/068; H04W 4/021; H04W 8/18; H04W 12/64; H04W 84/12
See application file for complete search history.

(56) References Cited

U.S. PATENT DOCUMENTS

| | | | |
|---|---|---|---|
| 8,176,490 B1* | 5/2012 | Jackson | G06F 21/305 718/100 |
| 9,740,990 B2* | 8/2017 | Watkins | G06Q 30/0206 |
| 10,163,150 B1* | 12/2018 | Eby | G06Q 30/0611 |
| 2010/0005512 A1* | 1/2010 | Wahl | H04L 63/08 726/4 |
| 2013/0137400 A1* | 5/2013 | Zinn | H04W 4/14 455/411 |
| 2023/0123576 A1* | 4/2023 | Gu | G06V 20/40 705/74 |
| 2023/0147221 A1* | 5/2023 | Fileccia | G09C 5/00 340/572.1 |

* cited by examiner

*Primary Examiner* — Beemnet W Dada

(57) ABSTRACT

A wireless communications system comprises a subscriber user equipment and a mobile expert user equipment. The subscriber user equipment is configured to log in to a subscription account application installed on the subscriber user equipment using subscriber credentials, wherein the subscriber credentials are pre-registered with a telecommunications service provider associated with a retail store, determine that the subscriber user equipment is located within a coverage area associated with the retail store after logging in to the subscription account application, and transmit an authentication message indicating an identity of a subscriber using the subscriber user equipment and indicating that the subscriber is pre-registered with the telecommunications service provider. The mobile expert user equipment is configured to obtain subscriber data describing a subscriber associated with the subscriber user equipment after the subscriber user equipment transmits the authentication message.

20 Claims, 10 Drawing Sheets

AUTOMATIC IN-STORE SUBSCRIBER DEVICE DETECTION AND PROCESSING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Retail stores operated by telecommunications service providers (TSP), such as T-MOBILE, often require a lengthy and complicated process by which to check-in customers entering the store. For example, a host mobile expert (ME) employed by the TSP may stand proximate the entrance of the store. When a customer enters the store, the customer may first need to verbally register with the host ME to be added to a service queue governing the order in which customers are serviced in the store. The host ME may verbally request information about the customer, such as, for example the customer's identification information (e.g., name, address, social security number, personal identification number (PIN), etc.) and requested service. The host ME may then manually enter the customer's identification information and requested service into a retail store application running on a device of the host ME to add the customer to the service queue. Therefore, when a customer needs to be serviced by a retail store, the customer may be required to verbally convey private identification information to the ME to verify the customer's identity.

However, such a verbal conveyance of private information during the check-in process can be easily overheard by others proximate to the customer, which is a clear security risk. In addition, the host ME may mistakenly enter the customer's identification information and/or requested service into the retail store application because the manual entry of verbally conveyed information is prone to error.

SUMMARY

In an embodiment, a wireless communications system is disclosed. The wireless communications system comprises a subscriber user equipment and a mobile expert user equipment. The subscriber user equipment comprises a first non-transitory memory configured to store first instructions, and a first processor coupled to memory and configured to execute the first instructions. The first instructions cause the first processor to be configured to log in to a subscription account application installed on the subscriber user equipment using subscriber credentials, wherein the subscriber credentials are pre-registered with a telecommunications service provider associated with a retail store, determine that the subscriber user equipment is located within a coverage area associated with the retail store after logging in to the subscription account application, and transmit an authentication message indicating an identity of a subscriber using the subscriber user equipment and indicating that the subscriber is pre-registered with the telecommunications service provider. The mobile expert user equipment is coupled to the subscriber user equipment. The mobile expert user equipment comprises a second non-transitory memory configured to store second instructions, and a second processor coupled to memory and configured to execute the second instructions. The second instructions cause the second processor to be configured to obtain subscriber data describing a subscriber associated with the subscriber user equipment after the subscriber user equipment transmits the authentication message, transmit, to a queue display device in the wireless communication system an instruction to add the subscriber to a service queue of the retail store, and display, on a user interface of the mobile expert user equipment, at least one of the subscriber data and a subscriber specific prompt.

In another embodiment, a method for automatically authenticating a subscriber user equipment with a mobile expert user equipment at retail store associated with a telecommunications service provider is disclosed. The method is performed by the subscriber user equipment. The method comprises logging in, by the subscriber user equipment, to a subscription account application installed on the subscriber user equipment using subscriber credentials, wherein the subscriber credentials are pre-registered with the telecommunications service provider associated with the retail store, determining, by subscription account application executing on the subscriber user equipment, that the subscriber user equipment is located within a coverage area associated with the retail store after logging in to the subscription account application, establishing, using a Wi-Fi direct application programming interface (API) of the subscriber user equipment, a Wi-Fi direct connection between the subscriber user equipment and a mobile expert user equipment in the retail store based on the subscriber credentials using the subscription account application, wherein the Wi-Fi direct connection enables the subscriber user equipment to communicate directly with the mobile user equipment, and transmitting, using the Wi-Fi direct API of the subscriber user equipment and the Wi-Fi direct connection, directly to the mobile expert user equipment, an authentication message indicating an identity of a subscriber using the subscriber user equipment and indicating that the subscriber is pre-registered with the telecommunications service provider, triggering the subscriber to be added to a service queue of the retail store.

In yet another embodiment, a subscriber user equipment for automatically authenticating the subscriber user equipment with a retail store associated with a telecommunications service provider is disclosed. The subscriber user equipment comprises a user equipment server application programming interface (API), a non-transitory memory configured to store instructions, and a processor coupled to memory and configured to execute the instructions. The instructions cause the processor to be configured to log in to a subscription account application installed on the subscriber user equipment using subscriber credentials, wherein the subscriber credentials are pre-registered with the telecommunications service provider associated with the retail store, determine, by the subscription account application, that the subscriber user equipment is located within a coverage area associated with the retail store after logging in to the subscription account application, and transmit, using of the user equipment server API, to a server in a core network associated with the telecommunications service provider, an authentication message indicating an identity of a subscriber using the subscriber user equipment and indicating that the subscriber is pre-registered with the telecommunications service provider, wherein the server transmits, to a mobile expert user equipment in the retail store, at least one of subscriber data describing the subscriber, an indication that the subscriber is authenticated, an instruction to add the subscriber to a service queue of the retail store, or a subscriber specific prompt.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
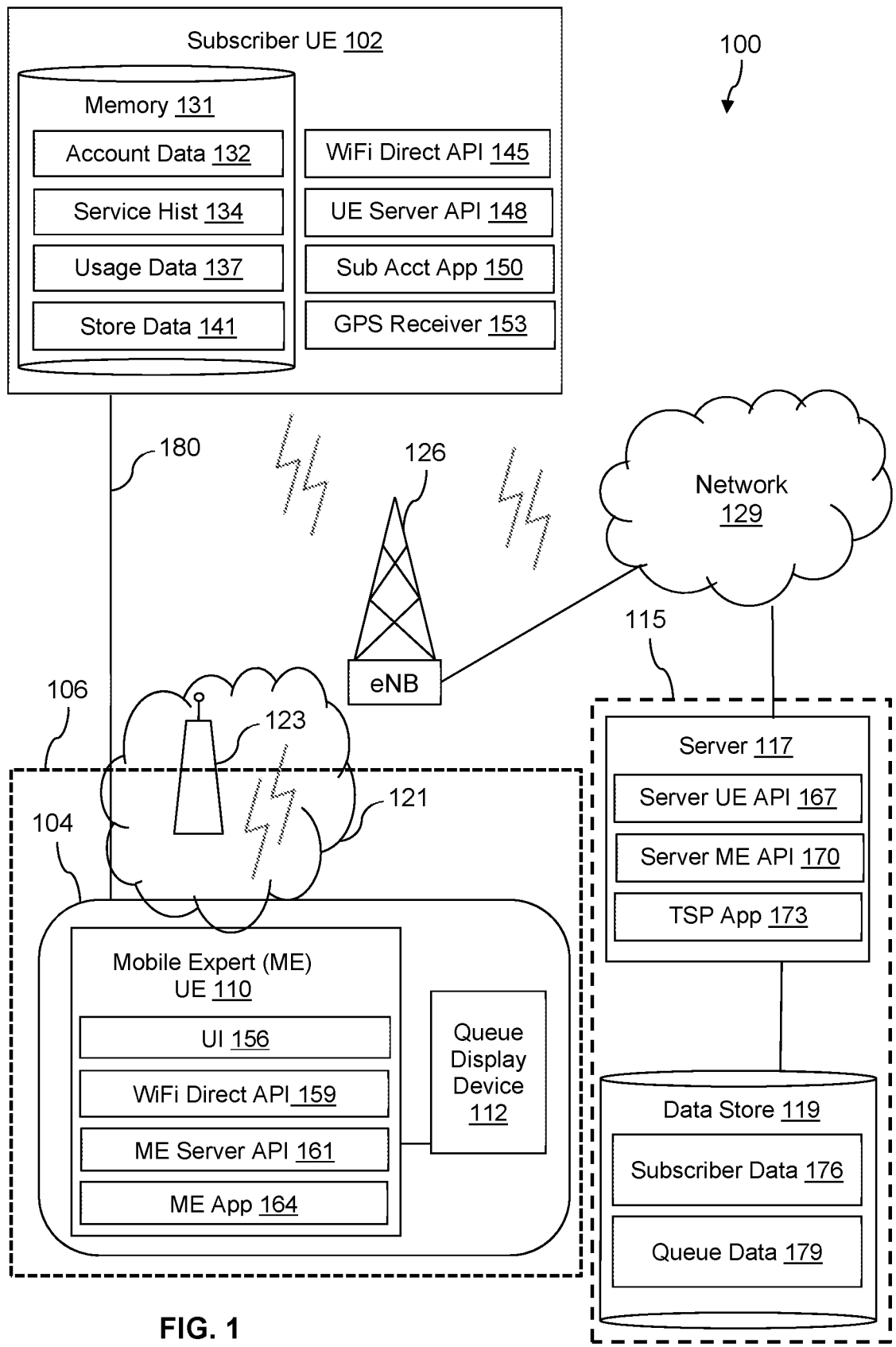
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Traditionally, a customer may first need to verbally register customer and device information with a host in a store of telecommunications service provider (TSP) to be added to a service queue governing the order in which customers are serviced in the store. As mentioned above, such a verbal conveyance of private information during the check-in process can be easily overheard by others proximate to the customer. Thus, the verbal conveyance of private information is a clear security risk, which may be repetitive and unnecessary.

In addition, the host may mistakenly enter the customer's identification information, device information, and/or requested service into the retail store application because the manual entry of verbally conveyed information is prone to error. This incorrectly entered information may still be sent to the core network operated by the TSP over the Internet, which likely results in an error message being returned from the core network. Thus, the error prone method of manually entering verbally conveyed information causes an unnecessary waste of computing and network resources in the system.

Lastly, the manually entered data may be transmitted on a path from a host device through a network to a backend server of the TSP for the backend server to authenticate the customer. The backend server may then transmit information indicating authentication of the customer back through the path in the network to the host device, before the device can add the customer to the service queue. Such an approach to authenticating a customer, by transmitting sensitive data on the path through the network, consumes an extensive amount of resources in the network. This approach to authenticating a customer also requires the backend server to perform authentication for the retail store. Therefore, this approach to authenticating a customer is inefficient in that consumes unnecessary networking and processing resources, not secure in that it requires transmitting sensitive data through the network, and error prone due to the manual entry of information.

The embodiments disclosed herein seek to eliminate these problems by defining specific computer implementations to authenticate a subscriber in a retail store in a manner that is processing and bandwidth efficient. The embodiments disclosed herein enable fewer pieces of sensitive data to be transmitted on a different path than the path listed in the approach above. In addition, the embodiments disclosed herein do not require the host to manually enter data to authenticate the subscriber and add the subscriber to the service queue.

In cases where (1) a current subscriber has an application associated with the TSP installed on the subscriber device and a subscriber account of the subscriber and the current subscriber is properly logged in to the application, the application can detect when the device enters a coverage area at or surrounding the retail store. For example, upon entering a coverage area associated with the retail store, the subscriber device is triggered to communicate with devices in the retail store or stored at the backend server of the TSP to (1) authenticate the subscriber with the retail store and TSP, (2) look-up subscriber information from a backend server associated with the TSP that is shared with the system in the retail store, and (3) queue the subscriber for service in the retail store.

In a first embodiment, the subscriber device may include components that configure the subscriber device to communicate using Wi-Fi direct. In such a case, the subscriber device can communicate directly with the device of a mobile expert (ME) in the retail store using a Wi-Fi direct connection, instead of having to transmit data over a network to a backend server. In this embodiment, the subscriber device may be triggered to send, to the ME device, an authentication message with information indicating that the subscriber device is authenticated based on the application running on the subscriber device. The ME device may use the authentication information to obtain subscriber data associated with the subscriber, obtain subscriber specific prompts for the subscriber, and add the subscriber to the service queue. In an embodiment, the subscriber specific prompt may be generated based on account data, usage history, and/or a service history of the subscriber.

In a second embodiment, the subscriber device can communicate with the ME device through a backend server associated with the TSP and located in a core network. In this embodiment, the subscriber device may be automatically triggered to send, to the backend server, a similar authentication message. The backend server may further authenticate the subscriber device, and upon authentication, the backend server may send subscriber data of the subscriber to the ME device. The backend server may also send, to the ME device, an instruction to add the subscriber to the service queue. The backend server may further generate the subscriber specific prompts and send the prompts to the ME device, such that the ME device displays the subscriber specific prompts on a display.

As such, the embodiments of the present disclosure greatly increase the subscriber experience in visiting a retail store while improving the efficiency and effectiveness of MEs employed at the retail store. In addition, the embodiments of the present disclosure greatly reduce (1) the amount of time required to check in and authenticate a subscriber at a retail store, and (2) the amount of data required to be communicated through the system and networks to check-in a subscriber at a retail store. For example, instead of a ME manually entering subscriber information to perform the check-in, the subscriber device may simply send out an authentication message, which includes an indication that the subscriber device is authenticated. Lastly, the embodiments disclosed herein increase the security surrounding the information used to authenticate a subscriber at the retail store since the information does not need to be verbally communicated, and may not even need to be forwarded through the system. Therefore, the embodiments disclosed herein provide an improvement to data communication systems operating with TSPs to provide services to subscribers because the embodiments disclosed herein reduce the amount of data consumed by the system while possibly preventing secure data from being unnecessarily transmitted through the system.

Turning now to FIG. 1, a communication system 100 is described. The system 100 comprises a subscriber user equipment (UE) 102, a retail store 104 positioned within a coverage area 106, a core network 115, a wireless local area network (WLAN) 121, a WLAN access point 123, a cell site 126, and a network 129. One or more ME UEs 110 and a queue display device 112 may be positioned within the retail store 104. The core network 115 may include a server 117 and a data store 119.

The retail store 104 may be a brick and mortal store owned and operated by a TSP. The coverage area 106 may be positioned at or around the perimeter of the retail store 104, for example, within a predefined proximity range of the retail store (e.g., 50-100 meters (m)). In an embodiment, the coverage area 106 may be implemented as a geofence around the retail store 104, as will be further described below.

The cell site 126 may provide the subscriber UE 102 and/or the ME UE 110 a wireless communication link to the core network 115 and/or the network 129 according to a a long term evolution (LTE), a code division multiple access (CDMA), or a global system for mobile communications (GSM) wireless telecommunication protocol. In this way, the subscriber UE 102 may be communicatively coupled to the core network 115 and the network 129 via the cell site 126.

The wireless access point 123 may provide the ME UE 110 a wireless communication link to the WLAN 121, the queue display device 112, the network 129, and/or the core network 115 according to a wireless protocol (e.g., Wireless Fidelity (Wi-Fi). In this way, the ME UE 110 may be communicatively coupled to the WLAN 121, the queue display device 112, the network 129, and/or the core network 115 via the wireless access point 123.

The WLAN 121 may be one or more private networks, one or more public networks, or a combination thereof. In an embodiment, the WLAN 121 may be a wireless network implemented according to the wireless protocol available to a plurality of different UEs and devices (e.g., ME UEs 110 and the queue display device 112) via the wireless access point 123. In an embodiment, the WLAN 121 may service the devices within the retail store 104 such that the devices within the retail store may connect to the WLAN 121 using WLAN 121 credentials (e.g., SSID and password). For example, one or more ME UE 110 positioned in a range of the WLAN 121 may enter the WLAN 121 credentials to join the WLAN 121 and access network 129 and/or core network 115.

The subscriber UE 102 may be a cell phone, a mobile phone, a smart phone, a personal digital assistant (PDA), an Internet of things (IoT) device, a wearable computer, a headset computer, a laptop computer, a tablet computer, or a notebook computer. In an embodiment, the subscriber UE 102 includes a non-transitory memory 131 for storing data, such as, account data 132, a service history 134, usage data 137, and store data 141. The account data 132 may refer to the subscription account of the subscriber operation the subscriber UE 102 (hereinafter referred to as simply the "subscriber"). For example, the account data 132 may include the account number, subscriber username and password, PIN, subscription plan, payment details, associated phone numbers and messaging accounts, installed applications, etc. The service history 134 may indicate previous ticketed service requests and services received from the TSP associated with the retail store 104 based on documented communications with MEs employed by the TSP. For example, the service history 134 may indicate that the subscriber UE 102 has been serviced for having a software issue related to the camera application, which was resolved by the ME. The usage data 137 may indicate usage statistics of various applications and services on the subscriber UE. For example, the usage data 137 may indicate that the subscriber spends 75 percent (%) of subscriber UE 102 resources on gaming applications. The store data 141 may include data regarding various retail stores operated by the TSP within a certain geographical range of the subscriber UE 102. For example, the store data may include the Global Positioning System (GPS) locations of one or more retail stores 104 within a 30-mile vicinity of the subscriber UE 102. In an embodiment, the store data 141 may be updated in real time as the subscriber UE changes locations. As should be appreciated, the non-transitory memory 131 may store other data not otherwise shown or described in relation to FIG. 1.

In an embodiment, the subscriber UE 102 may also include a Wi-Fi direct API 145, a UE server API 148, a subscription account application 150 (shown in FIG. 1 as the "Sub Acct App 150," also sometimes referred to herein as the "application 150"), and a GPS receiver 153. The Wi-Fi direct API 145 may be an API, or a set of functions, that supports establishment and data communication using a Wi-Fi direct connection to another peer device (e.g., the ME UE 110) using a Wi-Fi direct protocol. For example, the Wi-Fi direct API 145 includes the functions that enable the subscriber UE 102 to discover, request, and connect to peer devices to create a Wi-Fi direct connection without the use of an intermediary access point.

The Wi-Fi direct protocol enables a peer to peer connection between wireless devices without the use of an access point, such as the wireless access point 123. The Wi-Fi direct protocol and connection is further described in the Wi-Fi Alliance document entitled "Wi-Fi Direct Specification," dated Oct. 25, 2020, which is hereby incorporated by reference in its entirety (hereinafter referred to as the "Wi-Fi Direct Specification"). The UE server API 148 may be an API, or a set of functions, that support the establishment, maintenance, and communication via a wireless connection between the subscriber UE 102 and the server 117, for example, using the cell site 126.

The subscription account application 150 may be an application installed at the subscriber UE 102 and owned/operated by the TSP associated with the retail store 104. For example, when the retail store 104 is T-MOBILE, the application 150 may be a T-MOBILE application associated with products and services provided by T-MOBILE. The application 150 may include content based on the subscriber associated with the account that has been logged in through the application 150. For example, customers and subscribers may use the application 150 to purchase products and services, request tickets for services associated with the account, communicate with customer service representations of the TSP, etc. The subscriber may use an application marketplace to download and install the application 150 from, for example, the core network 115. Once installed, the subscriber may create an online account with newly created subscriber credentials (e.g., username and password) based on subscriber information that has already been registered with the TSP (e.g., personally identifying information (PII), account number, PIN, etc.). The subscriber may then login to the application 150 using the newly created subscriber credentials. In the case that the subscriber has already created subscriber credentials for the account, the subscriber may simply login to the application 150 using the subscriber credentials. Upon logging in to the application 150, the application 150 may cause information related to the subscriber's account to be displayed at the subscriber UE 102.

The GPS receiver 153 may be a hardware device (e.g., processor or receiver) included in the subscriber UE 102 that is used to determine a current location of the subscriber UE 102. As should be appreciated, the subscriber UE 102 may include other applications, APIs, and hardware components other than those shown and described with relation to FIG. 1.

The ME UE 110 may also be a cell phone, a mobile phone, a smart phone, a PDA, an IOT device, a wearable computer, a headset computer, a laptop computer, a tablet computer, or a notebook computer. In an embodiment, the ME UE 110 may include a user interface (UI) 156, a Wi-Fi direct API 159, a ME server API 161, and a ME application 164. The UI 156 may be an interface displayed on a display of the ME UE 110 by which the ME can interact with to enter data, edit data, and make selections on various applications.

The Wi-Fi direct API 159 in the ME UE 110 may be similar to the Wi-Fi direct API 145 in the subscriber UE 102, except that the Wi-Fi direct API 159 may be an API, or a set of functions, that enable the ME UE 110 to communicate to another peer device (e.g., the subscriber UE 102) using a Wi-Fi direct connection. As should be appreciated, the ME UE 110 may include other applications, APIs, and hardware components other than those shown and described with relation to FIG. 1. The ME server API 161 may be an API, or a set of functions, that support the establishment, maintenance, and communication via a wireless connection to the server 117, for example, using the cell site 126.

The ME application 164 is similar to the subscription account application 150 installed at the subscriber UE 102, in that the ME application 164 is owned/operated by the TSP associated with the retail store 104. However, a ME employed by the TSP may log in to the ME application 164, instead of a subscriber. The ME application 164 may display different data than the subscription account application 150 because the ME application 164 may be used to add customers to the service queue, provide information to customers, or provide a service to a customer. For example, the ME may use the UI 156, which may display content of the ME application 164, to add customers to the service queue, provide information to customers, or provide a service to a customer. In an embodiment, the ME application 164 may determine one or more subscriber specific prompts to display on the UI 156 based on subscriber data of a subscriber that has walked in to the retail store 104, as will be further described herein. In this way, the ME application 164 may have a wider range of permissions than the subscription account application 150 at the subscriber UE 102.

The queue display device 112 may be a display device, such as a television or a computer monitor, with a display screen. The queue display device 112 may display the service queue, which is an ordered queue of customers and/or subscribers that have entered the coverage area 106 and require information or a service from a ME. In one case, the ME UE 110 may be communicatively coupled to the queue display device 112 via the wireless access point 123 of the WLAN 121. Alternatively, the ME UE 110 may be communicatively coupled to the queue display device 112 using a Wi-Fi direct connection, without the use of the wireless access point 123. As should be appreciated, the ME UE 110 may be communicatively coupled to the queue display device 112 using any type of connection that enables secure communication.

In an embodiment, the core network 115 is an evolved packet core (EPC), which may be coupled to one or more radio access networks (RANs) and operated by the TSP, such as T-MOBILE. Pre-paid customers may use the subscriber UEs 102 to subscribe to a plan provided by the TSP via the core network 115. The core network 115 may be a configured to implement a 5G, a LTE, a CDMA, or a GSM wireless telecommunication protocol. In one embodiment, the core network 115 may be a 3rd Generation Partnership Project (3GPP) Evolved Packet System (EPS).

As mentioned above, the core network 115 may include the server 117 and the data store 119, which may be interconnected by a wired or wireless link. The server 117 may include a server UE API 167, a server ME API 170, and a TSP application 173. The server UE API 167 may be an API, or a set of functions, that support the establishment and maintenance of a wireless connection to the UE server API 148 in the subscriber UE 102, for example, using the cell site 126. The server ME API 170 may be an API, or a set of functions, that support the establishment and maintenance of a wireless connection to the ME server API 161 in the ME UE 110, for example, using the cell site 126.

The data store 119 may be a non-transitory memory that stores, for example, subscriber data 176 and queue data 179. The subscriber data 176 may be a logical database which contains subscription information of one or more subscribers that have pre-registered with the TSP. For example, the subscriber data 176 may include subscriber credentials, account number, PIN, subscription information, installed applications, payment details, etc. The queue data 179 may include a service queue for each retail store 104 associated with the TSP. For example, the queue data 179 for the retail store 104 may include a queue listing subscribers and/or potential customers that are in the coverage area 106. FIG. 1 shows the subscriber data 176 and the queue data 179 as being stored in the core network 115. However, it should be appreciated that the subscriber data 176 and/or the queue data 179 may be stored elsewhere in the system 100, for example, in the ME UE 110, in a memory positioned in the retail store 104, and even in the non-transitory memory 131 of the subscriber UE 102.

In an embodiment, the server 117 may execute the TSP application 173 to authenticate a subscriber that has entered the coverage area 106, obtain subscriber data 176 associated with the subscriber, add the subscriber to the queue data 179 of the retail store 104, and determine subscriber specific prompts for the subscriber. The server 117 may then transmit authentication information, queue data 179, and the subscriber specific prompts to one or more ME UEs 110 and the queue display device 112 in the retail store 104.

The server 117 may be implemented as a computer system, which is described further hereinafter. As should be appreciated, the server 117 may include other APIs and applications not otherwise shown or described in relation to FIG. 1. In addition, the data store 119 may store other data not otherwise shown or described in relation to FIG. 1.

The network 129 may be one or more private networks, one or more public networks, or a combination thereof. In an embodiment, the components within the core network 115 may also be part of the network 129, but are illustrated separately in FIG. 1 to further clarify the present disclosure.

Turning now to the operation of system 100, the subscriber UE 102 may enter the location of the coverage area 106, which may trigger the subscription account application 150 to determine that the subscriber UE 102 is in or in the vicinity of the retail store 104. The subscription account application 150 may detect entrance into the coverage area 106 in various ways. In one embodiment, the store data 141 indicates the location area (e.g., coordinates or position on a map) of the coverage area 106. In this embodiment, the application 150 may compare a current location of the subscriber UE 102, determined using the GPS receiver 153, with the location area of the coverage area 106 to determine whether the subscriber UE 102 is in the coverage area 106.

In an embodiment, location sharing may be enabled on the application 150 for the application 150 to detect when the device enters a coverage area at or surrounding the retail store. For example, a setting on the subscriber UE 102 for the application 150 may be set to indicate whether or not location sharing is enabled. When location sharing is enabled, the application 150 may be permitted to share a geographical location of the subscriber UE 102 or a proxy of the location of the subscriber UE 102. For example, a proxy of the location of the subscriber UE 102 may refer to an identity or a geographical location of a cell site to which the subscriber UE 102 is attached by a radio link, an identity or a geographical location of a Wi-Fi access point to which the subscriber UE 102 is attached, or an identity or geographical location of one or more Wi-Fi access points detectable by the subscriber UE 102. As should be appreciated, the proxy of the location of the subscriber UE 102 may refer to other locations associated with the location of the subscriber UE 102, without necessarily referring to an actual geographical location of the subscriber UE 102 itself.

In another embodiment, the coverage area 106 corresponds to a geofence, which is used by the application 150 to determine that the subscriber UE 102 is entering the geofence using one or more of a Wi-Fi connection to the network 129 via the wireless access point 123, cellular connection to the network 129 via the cell site 126, GPS positioning, and BLUETOOTH beacons. In addition, as the subscriber UE 102 moves around in the coverage area, the subscription account application 150 may recalculate the position of the subscriber UE 102 periodically using one or more of the Wi-Fi connection to the network 129 via the wireless access point 123, cellular connection to the network 129 via the cell site 126, GPS positioning, and BLUETOOTH beacons. Using this geofencing technique, certain actions may be automatically triggered at the subscriber UE 102 upon the subscription account application 150 detecting that the subscriber UE 102 is at a certain position or location in the coverage area 106, as further described below. As should be appreciated, the embodiments disclosed herein contemplate other methods of determining a position of the subscriber UE 102 relative to the coverage area 106 that are not explicitly described herein.

In some embodiments, the geofencing techniques are enabled only when the subscriber is logged in to the application 150 at the subscriber UE 102. In an embodiment, the geofencing techniques may be enabled when location sharing is enabled on the application 150. In some cases, TSPs may require the subscriber to log in to the application 150 periodically to ensure that the subscriber is properly authenticated with the TSP. For example, the T-MOBILE application on the subscriber UE 102 may request that the subscriber re-enter the subscriber credentials every week to stay logged in to the T-MOBILE application. In this case, the geofencing techniques may only be enabled when the subscriber is properly logged in to the application 150 at the subscriber UE 102, and thus, authenticated.

In either embodiment, the application 150 detects that the subscriber UE 102 has entered the coverage area 106 associated with the retail store 104. Upon detecting that the subscriber UE 102 has entered the coverage area 106, the subscription account application 150 may be triggered (e.g., using the geofencing technique described above) to generate an authentication message. In an embodiment, the authentication message may indicate that the subscriber UE 102, or the subscriber using and registered with the subscriber UE 102, is authenticated through the application 150 running on the subscriber UE 102. For example, the authentication message may include the subscriber credentials entered by the subscriber to log in to the application 150 and/or PII related to the subscriber. The subscriber credentials and/or PII may be encrypted for security purposes. In another embodiment, the authentication message may be a message including an identifier of the subscriber UE 102 and an indication that the subscriber UE 102 has logged in to the application 150 running on the subscriber UE 102 that has entered the coverage area 106, and thus, is pre-registered with the TSP. For example, the indication may be a flag or a value set to signal that the subscriber credentials are stored in association with the subscriber at a data store 119 associated with the TSP.

In an embodiment, once the subscriber UE 102 generates the authentication message, the subscriber UE 102 may use the application 150 to transmit the authentication message to either the ME UE 110 or the server 117 based on the types of connections available in the retail store 104. The subscriber UE 102 may also use the application 150 to transmit the authentication message to either the ME UE 110 or the server 117 based on whether the subscriber UE 102 and/or the ME UE 110 are configured to establish and maintain a Wi-Fi direct connection 180.

In a first embodiment, the subscriber UE 102, using the application 150, may transmit the authentication message to the ME UE 110 via a Wi-Fi direct connection 180 using the Wi-Fi direct API 145 and the Wi-Fi direct API 159. In one case, both the subscriber UE 102 and the ME UE 110 may be configured to establish and maintain a Wi-Fi direct connection 180. In another case, only the ME UE 110 may be configured to establish and maintain a Wi-Fi direct connection 180. In either case, the subscriber UE 102 or the ME UE 110 are configured to establish and maintain a Wi-Fi direct connection 180 when the at least one of the UEs 102 and 110 includes hardware and software that enables the UE to be capable of transmitting data through a peer to peer connection between wireless devices.

When at least one of the subscriber UE 102 or the ME UE 110 is capable of establishing the Wi-Fi connection 180, the UEs 102 and 110 may initiate the establishing of the Wi-Fi connection 180. To initiate the Wi-Fi connection 180, the UEs 102 and 110 may transmit beacon frames to discover other devices in the coverage area 106, and subsequently exchange probe messages to exchange device information, as further described herein. For example, the application 150 may use the Wi-Fi direct API 145 at the subscriber UE 102 may transmit beacon frames to discover other devices in the coverage area 106, and transmit probe messages to exchange device information. Similarly, the ME application 164 may use the Wi-Fi direct API 159 at the ME UE 110 may transmit beacon frames to discover other devices in the coverage area 106, and transmit probe messages to exchange device information. Once the probe messages are exchanged to indicate to the UEs 102 and 110 that each is capable of Wi-Fi direct communication, then the Wi-Fi direct connection 180 may be established.

In this first embodiment, the subscriber UE 102 then transmits, to the ME UE 110 via the Wi-Fi direct connection 180 using the Wi-Fi direct API 145, the authentication message indicating whether the subscriber UE 102, or the subscriber using and registered with the subscriber UE 102, is authenticated through application 150. In this embodiment, the authentication message may be transmitted directly from the subscriber UE 102 to the ME UE 110 through the Wi-Fi direct connection 180, without the use of an intermediary access point.

In a second embodiment, the subscriber UE 102 may transmit the authentication message to the server 117 via the cell site 126 using the UE server API 148 and the server UE API 167, for example, using a data roaming or LTE connection. For example, when a Wi-Fi direct connection 180 is not available between the subscriber UE 102 and the ME UE 110, the subscriber UE 102 may be triggered to transmit the authentication message to the server 117 upon entering the coverage area 106.

In an embodiment, the server 117 may receive the authentication message using the server UE API 167, and the TSP application 173 may use the authentication message to confirm that the subscriber UE 102 is authenticated using, for example, the subscriber data 176. For example, the authentication message may include PII of the subscriber and the subscriber credentials used to log in to the application 150 at the subscriber UE 102. In this case, the TSP application 173 may compare the mapping of the PII of the subscriber and the subscriber credentials with the subscriber data 176 associated with the subscriber to determine whether the subscriber data matches the data received in the authentication message. As another example, the authentication message may include an identifier of the subscriber UE 102 and the subscriber credentials used to log in to the application 150 at the subscriber UE 102. In this case, the TSP application 173 may compare the mapping of the identifier of the subscriber UE 102 and the subscriber credentials with the subscriber data 176 associated with the subscriber UE 102. When the information received in the authentication message matches the information in the subscriber data 176, the TSP application 173 may determine that the subscriber UE 102 is authenticated, for example, with the TSP operating the server 117.

In an embodiment, the TSP application 173 may then generate an instruction to add the subscriber to the service queue of the retail store 104. In this case, the TSP application 173 may then update the queue data 179 to indicate that the subscriber has been added to the service queue for the retail store 104.

In an embodiment, the TSP application 173 may also use the subscriber data 176 to determine subscriber specific prompts for the subscriber that has entered the coverage area 106. For example, the subscriber data 176 may include usage data 137 indicating that the subscriber UE 102 spends a large majority of time on social media applications running on the subscriber UE 102. In this case, the TSP application 173 may determine that the subscriber may be interested in subscribing to a higher bit rate subscription plan. The TSP application 173 may then generate subscriber specific prompt indicating that a ME in the retail store 104 should inquire whether the subscriber is interested in upgrading to a higher bit rate subscription plan. As another example, the subscriber data 176 may include the account data 132 and the service history 134. In this case, the TSP application 173 may determine, from the account data 132, that the subscriber's contract is expiring in the next month. In addition, the TSP application 173 may determine, for example, that the subscriber's service history 134 indicates that the subscriber previously requested a resolution of a mobile phone display screen to be adjusted. Based on this, the TSP application 173 may generate a subscriber specific prompt indicating that a ME in the retail store 104 should inquire whether the subscriber is interested in renewing the contract with a new mobile phone having a larger display screen and a higher resolution than the previous mobile phone.

The TSP application 173 may then use the server ME API 170 to transmit, to the ME UE 110 via the cell site 126 using a data roaming or LTE connection, at least one of an indication that the subscriber UE 102 is authenticated, the instruction to add the subscriber to the service queue of the retail store 104 and the subscriber specific prompts. When the queue data 179 is stored at the retail store 104, the TSP application 173 may also use the server ME API 170 transmit the updated queue data 179 to the ME UE 110, queue display device 112, or other device in the retail store 104 using, for example, the cell site 126.

In a third embodiment, the subscriber UE 102 may have previously entered the retail store 104, and previously accessed the WLAN 121 by manually entering the SSID and the password of the WLAN 121 into the subscriber UE 102. In this case, the subscriber UE 102 may automatically connect to the WLAN 121 upon subsequently entering the coverage area 106 or the retail store 104. After entering the coverage area 106 and connecting to the WLAN 121, the subscriber UE 102 may be triggered to transmit the authentication message to the ME UE 110. Unlike the first embodiment, in this third embodiment, the subscriber UE 102 may transmit the authentication message to the ME UE 110 using the WLAN 121 and the wireless access point 123. While only three embodiments are described here, it should be appreciated that the UEs 102 and 110 and the core network 115 may communicate in other secure manners not explicitly described herein.

In either the first, second, or third embodiment listed above, or other embodiments not explicitly described herein, the ME UE 110 receives the authentication message, or another variation of the authentication message (e.g., the indication that the subscriber UE 102 is authenticated, the instruction to add the subscriber to the service queue of the retail store 104, and/or the subscriber specific prompts). In the case that the ME UE 110 receives the authentication message from the subscriber UE 102 (i.e., the first and third embodiments listed above) via the Wi-Fi direct API 159, the ME application 164 may perform steps similar to the TSP application 173 at the server 117 to generate the instruction to add the subscriber to the service queue of the retail store 104. In an embodiment, the ME application 164 may update the queue data 179 stored within the retail store 104 or may communicate with the server 117 via the cell site 126 using the ME server API 161 to update the queue data 179, both to indicate that the subscriber has been added to the service queue for the retail store 104. The ME application 164 may also communicate with the server 117 via the cell site 126 using the ME server API 161 to obtain relevant subscriber data 176 describing the subscriber of the subscriber UE 102. In an embodiment, the ME application 164 may use the subscriber data 176 to generate the subscriber specific prompts, in a manner similar to the way the TSP application 173 generates the subscriber specific prompts, as described above.

In an embodiment, the ME UE 110 may transmit, to the queue display device 112, the instruction to add the subscriber to the service queue (e.g., using the WLAN 121 or a Wi-Fi direct connection). In response to receiving this instruction, the queue display device 112 may display an updated service queue in which, for example, a name of the subscriber has been added to the service queue.

In an embodiment, when the subscriber is next in the service queue, a ME may determine, using the geofencing techniques described above, a position of the subscriber UE 102 in the retail store 104. For example, the application 150 may be triggered to periodically transmit, to the ME UE 110 using the Wi-Fi direct APIs 145 and 159, an updated location of the subscriber UE 102 within the geofence associated with the coverage area 106. The ME may then approach the subscriber to confirm the identity of the subscriber and remove the subscriber name from the service queue. In an embodiment, the ME application 164 may cause the ME UE 110 to display, using the UI 156 of the ME application 164, a selectable icon associated with the subscriber, which, upon selection, indicates that the ME is currently providing service to the subscriber. The selection of the icon may trigger the ME application 164 to generate an instruction to remove the subscriber from the service queue, and send this instruction to the queue display device 112 and the server 117 using the ME server API 161 and the server ME API 170. The queue display device 112 may update the displayed service queue to remove the subscriber from the service queue. Similarly, the TSP application 173 may update the queue data 179 to remove the subscriber from the queue data 179. When the queue data 179 is maintained locally in the retail store, the ME UE 110 may update the locally maintained queue data 179 to also remove the subscriber.

Upon selecting the icon associated with the subscriber, the UI 156 may display, for example, subscriber account data 132 and/or the subscriber specific prompts. For example, the UI 156 may display account data 132, such as the subscriber name, account number, subscription plan, etc., on one side of the display. The main area of the UI 156 may display the subscriber specific prompts, which may prompt the ME to inquire about more specific needs of the subscriber.

Continuing with the examples described above, the UI 156 may include a user interface element displaying the subscriber specific prompt (e.g., "Interested in upgrading to a higher bit rate subscription plan?" or "Interested in renewing a contract with a particular new mobile phone having a larger display screen and a higher resolution than the previous mobile phone?"). Below the subscriber specific prompt, the UI 156 may include selectable icons (e.g., "yes," "no," "accept," "reject") that the ME may select to indicate the subscriber's response to the offer associated with the subscriber specific prompt. The ME UE 110 may transmit information regarding the subscriber's response back to the server 117 using the ME server API 161 and the server ME API 170. The information regarding the subscriber's response may be stored and used again to ensure that similar offers are not presented to the subscriber.

As described herein, the embodiments of the present disclosure greatly increase the subscribers experience in visiting a retail store while improving the efficiency and effectiveness of MEs employed at the retail store. The automatic detection and processing of a subscriber UE 102, as disclosed herein, may be entirely transparent to the subscriber. That is, the subscriber may simply walk in to the retail store and see the subscriber's name automatically being displayed in the service queue, with little to no interaction with MEs. The MEs similarly do not need to perform the extensive check-in process when a subscriber enters the retail store.

In addition, the embodiments of the present disclosure reduce the amount of time required to check in and authenticate a subscriber at a retail store 104 since the check in process is automated between the subscriber UE 102 and either the ME UE 110 or the server 117. By automating the check in process, the amount of data required to be transmitted between the subscriber UE 102 and either the ME UE 110 or the server 117 for authentication purposes is reduced, thereby increasing resources (e.g., bandwidth, latency, bit rate, etc.) within the system 100. For example, instead of a ME manually entering a subscriber account number, PIN, social security number, security questions, etc., into the ME UE 110, and forwarding this information to the server 117 for authentication, the system 100 merely requires the authentication message to be sent to either the ME UE 110 or the server 117. The authentication message may be, in one embodiment, simply an indication that the subscriber UE 102 is running the subscription account application 150 using validated subscriber credentials, as described above.

In addition, the embodiments disclosed herein increase the security surrounding the PII used to authenticate a subscriber at the retail store 104 since the PII does not need to be verbally communicated, and may not even need to be forwarded through the system 100. This in turn also reduces the chances of the ME mistakenly entering the verbally communicated information into the system 100, which can clog the resources of the system 100. Therefore, the embodiments disclosed herein reduce resource consumption within the system 100 and within networks by which UEs 102 and 110 and the core network 116 communicate.

Figure 2:
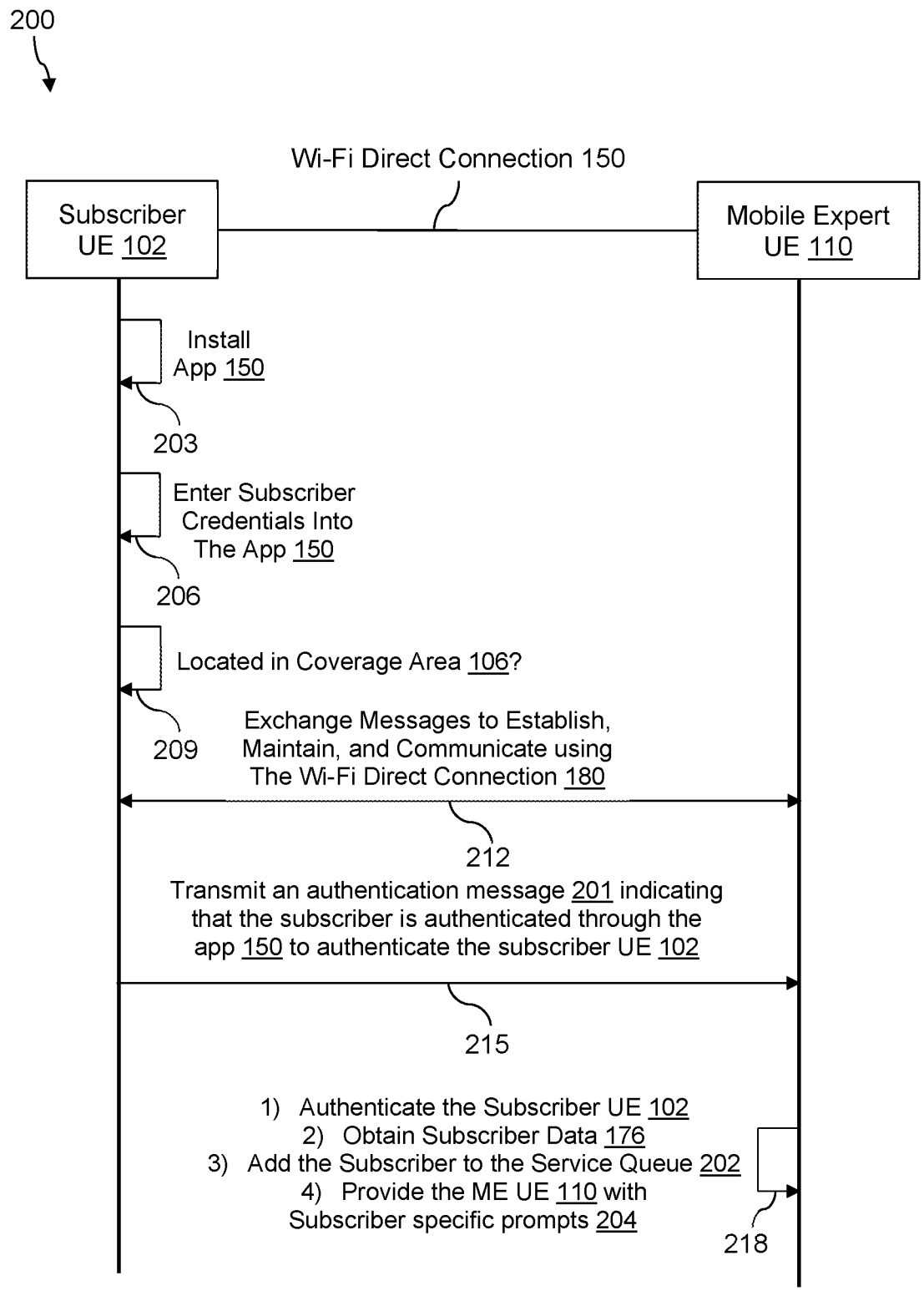
FIG. 2 is a message sequence diagram of a first method performed by the communication system of FIG. 1 according to an embodiment of the disclosure.

Referring now to FIG. 2, a message sequence diagram illustrating a method 200 is described. The method 200 corresponds to the first embodiment described above, and is performed by the subscriber UE 102 and the ME UE 110. As shown in FIG. 2, the subscriber UE 102 and the ME UE 110 are communicatively coupled together via the Wi-Fi direct connection 150.

In an embodiment, the method 200 is performed after subscriber UE 102 is registered with the TSP associated with the server 117. For example, the subscriber using the subscriber UE 102 may have pre-paid for a subscription plan with the TSP based on a contract for a period of time. During the registration process, the subscriber may have provided the TSP with PII, payment information, subscriber credentials (username and password) for the subscription account application 150, etc., all of which may be stored in the subscriber data 176. The subscriber UE 102 is registered with the TSP when the data related to the subscriber UE 102 is stored at the core network 115 in association with the subscriber information stored in the subscriber data 176.

The method 200 may begin with step 203, in which the subscriber UE 102 downloads and installs the subscription account application 150. The subscriber UE 102 may launch the application 150, which prompts the subscriber to enter the pre-registered subscriber credentials, at step 206. The application 150 may require the subscriber to re-enter the pre-registered subscriber credentials at predetermined intervals (e.g., daily, weekly, monthly, etc.).

At step 209, when the subscriber is logged in to the application 150, the application 150 whether the subscriber UE 102 is located within the coverage area 106 surrounding the retail store 104. As described above, the application 150 may detect whether the subscriber UE 102 is located within the coverage area 106 using various methods of positioning. For example, the application 150 may detect whether the subscriber UE 102 is located within the coverage area 106 by comparing a GPS position of the subscriber UE 102 with a known location of the retail store 102 stored in the store data 141. Alternatively, the application 150 may detect whether the subscriber UE 102 is located within the coverage area 106 using the geofencing techniques described above.

At step 212, the subscriber UE 102 and the ME UE 110 may exchange beacon, probe request, and probe response messages to establish, maintain, and communicate using the Wi-Fi direct connection 180 and the Wi-Fi direct APIs 145 and 159. In an embodiment, at least one of the subscriber UE 102 and the ME UE 110 are capable of Wi-Fi direct communication.

The UEs 102 and 110 may transmit beacon frames to discover other devices in the coverage area 106, and subsequently exchange probe request and probe response messages to exchange device information. In an embodiment, the Wi-Fi direct API 145 is triggered to send a probe request upon entering the coverage area 106. Similarly, the Wi-Fi direct API 159 is triggered to send a probe request upon the subscriber UE 102 entering the coverage area 106. The probe requests may include various information such as, for example, information identifying the respective UE 102 or 110 sending the probe request, and a capability of the respective UE 102 or 110 for establishing and communicating through the Wi-Fi direct connection 180. The probe requests may include other information as described by the Wi-Fi Direct Specification.

Upon receiving the probe request, the respective UE 102 or 110 may respond with a probe response when the respective UE 102 or 110 is capable of establishing and communicating through the Wi-Fi direct connection 180 using the Wi-Fi direct APIs 145 and 159. The probe response may similarly include information identifying the respective UE 102 or 110 sending the probe response, and a capability of the respective UE 102 or 110 for establishing and communicating through the Wi-Fi direct connection 180. The probe responses may include other information as described by the Wi-Fi Direct Specification. Once the probe request and probe response messages are exchanged to indicate to the UEs 102 and 110 that each is capable of Wi-Fi direct communication, then the Wi-Fi direct connection 180 may be established.

At step 215, the application 150 then generates an authentication message 201 indicating whether the subscriber UE 102 is authenticated through application 150, and then transmits the authentication message 201 to the ME UE 110 through the Wi-Fi direct connection 180. In an embodiment, the authentication message 201 may include an indication that the subscriber UE 102, or the subscriber using and registered with the subscriber UE 102, is authenticated through to application 150 running on the subscriber UE 102. For example, the authentication message 201 may include the subscriber credentials entered by the subscriber to log in to the application 150, PII related to the subscriber, an identifier of the subscriber UE 102, and/or an indication that the subscriber UE 102 has logged in to the application 150 running on the subscriber UE 102 that has entered the coverage area 106. The information included in the authentication message 201 may vary, but generally includes any information that serves to indicate that the subscriber UE 102 is authenticated with the TSP. In this embodiment, the authentication message 201 may be transmitted directly from the subscriber UE 102 to the ME UE 110 through the Wi-Fi direct connection 180, without the use of an intermediary access point.

At step 218, the ME application 164 at the ME UE 110 may use the information in the authentication message 201 to perform various steps, some of which is shown in FIG. 2. For example, suppose the content of the authentication message 201 may indicate that the subscriber UE 102 is logged in to the application 150, and the content of the authentication message 201 may also include an account number of the subscriber UE 102. First, the ME application 164 uses the content of the authentication message 201 to authenticate the subscriber UE 102. In this example, ME application 164 may use the indication in the authentication message 201 that the subscriber UE 102 is logged in to the subscription account application 150 to determine that the subscriber UE 102 is authenticated.

Next, the ME application 164 may use the account number of the subscriber UE 102 to obtain subscriber data 176. As mentioned above, the subscriber data 176 may be stored locally at the ME UE 110, at a local server at the retail store 104, or at the server 117 in the core network 115. As such, the ME application 164 may obtain or receive the subscriber data 176 based on the location of the subscriber data 176 describing the subscriber.

The ME application 164 may add the subscriber to the service queue 202 at the retail store 104 by sending an instruction to the queue display device 112 and updating the queue data 179, as described above. Further, the ME application 164 may generate subscriber specific prompts 204 and display the subscriber specific prompts 204 on the UI 156, as described above.

Figure 3:
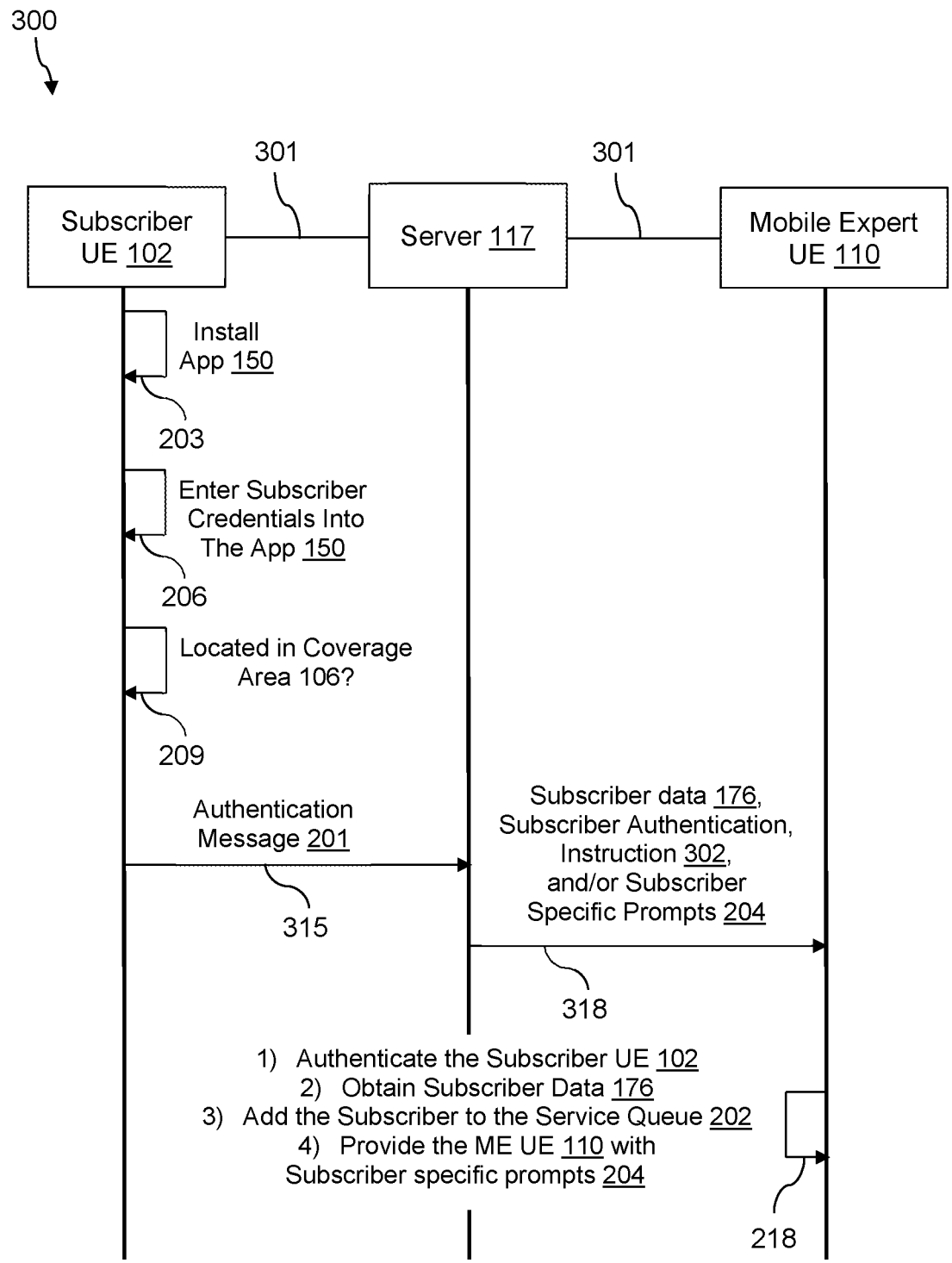
FIG. 3 is a message sequence diagram of a second method performed by the communication system of FIG. 1 according to an embodiment of the disclosure.

Referring now to FIG. 3, a message sequence diagram illustrating a method 300 is described. The method 300 corresponds to the second embodiment described above, and is performed by the subscriber UE 102, the server 117, and the ME UE 110. In the method 300, the subscriber UE 102 and the server 117 are communicatively coupled via a link 301, which may refer to a data roaming or LTE network through which data is transmitted via the cell site 126. Similarly, the server 117 and the ME UE 110 are communicatively coupled via the link 301.

Similar to method 200, the method 300 is performed after subscriber UE 102 is registered with the TSP associated with the server 117. Method 300 is similar to method 200 in that method 300 begins with steps 203, 206, and 209, which are described above with reference to FIG. 2. Method 300 is different from method 200 in that the subscriber UE 102 and the ME UE 110 communicate via the server 117 using a data connection, instead of directly using a Wi-Fi direct connection 180.

After the subscriber UE 102 installs the subscription account application 150 at step 203, enters subscriber credentials into the application 150 at step 206, and the application 150 determines that the subscriber UE 102 is located within the coverage area 106, the method 300 proceeds with step 315. At step 315, the application 150 generates the authentication message 201 and the application 150 transmits, using the UE server API 148, the authentication message 201 to server UE API 167 at the server 117 via the link 301.

As described above, the TSP application 173 may use the authentication message 201 to confirm that the subscriber UE 102 is authenticated, for example, using the subscriber data 176. The TSP application 173 may fetch subscriber data 176 related to the subscriber from the data store 119. The TSP application 173 may then generate an instruction 302 to add the subscriber to the service queue 202 at the retail store 104, and use the subscriber data 176 to determine subscriber specific prompts 304 for the subscriber that has entered the coverage area 106.

At step 318, the TSP application 173 may then transmit, to the ME UE 110 via the link 301 using the server ME API 170, at least one of the subscriber data 176 describing the subscriber, an indication that the subscriber UE 102 is authenticated, the instruction 302 to add the subscriber to the service queue 202 of the retail store 104, or the subscriber specific prompts 204. As mentioned above, the instruction 302 may instruct the ME UE 110 to further instruct the queue display device 112 to update the service queue 202 to indicate the subscriber. In another embodiment, the TSP application 173 may transmit, directly to the queue display 112 via the link 301 using the server ME API 170, the instruction 302, which triggers the queue display device 112 to update the service queue 202. The instruction 302 may also update the queue data 179, either at the core network 115 or stored locally at the retail store 104, to be updated to reflect the addition of the subscriber to the service queue 202. The ME UE 110 may receive, using the ME server API 161, the subscriber specific prompts 204 in the form of display prompts displayed on the UI 156 of the ME UE 110.

Figure 4:
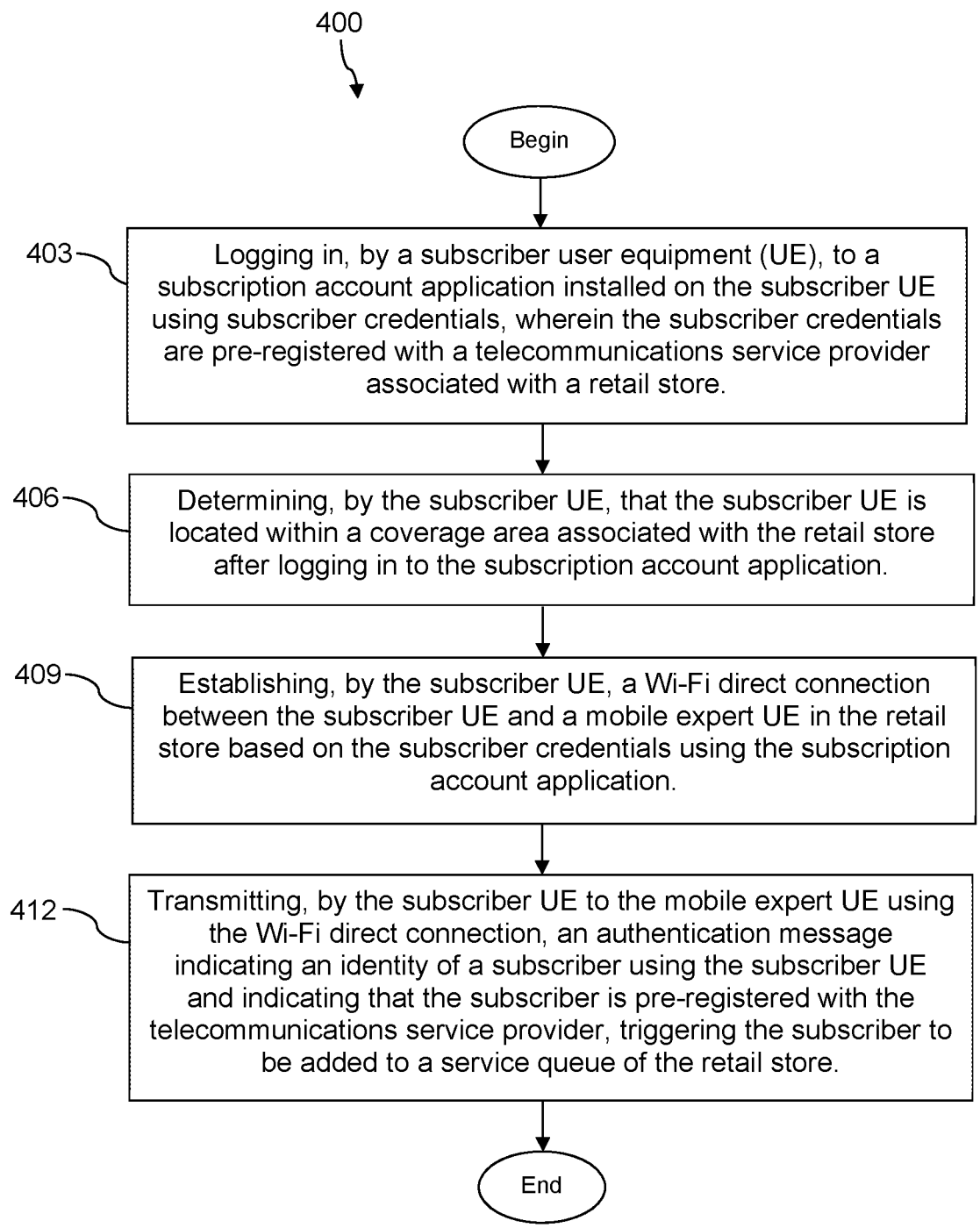
FIG. 4 is a flow chart of a first method performed by a subscriber user equipment (UE) in the communication system of FIG. 1 according to an embodiment of the disclosure.

Turning now to FIG. 4, a method 400 is described. In an embodiment, the method 400 is a method for automatically authenticating the subscriber UE 102 with a ME UE 110 at a retail store 104 associated with a TSP. The method 400 may be performed by the subscriber UE 102 after the subscriber has registered with the TSP (e.g., the server 117 and/or data store 119 in the core network 115). The method 400 corresponds to the first embodiment described above and with reference to the method 200 of FIG. 2.

At block 403, the method 400 comprises logging in, by the subscriber UE 102, to a subscription account application 150 installed on the subscriber UE 102 using subscriber credentials. In an embodiment, the subscriber credentials are pre-registered with the TSP associated with the retail store 104. In an embodiment, subscriber credentials may be pre-registered with the TSP when the subscriber credentials are stored in the subscriber data 176, at the data store 119 in the core network 115. Other credentials also associated with the subscriber and/or the subscriber UE may also be pre-registered with the TSP.

At block 406, the method 400 comprises determining, by the subscriber UE 102, that the subscriber UE 102 is located within a coverage area 106 associated with the retail store 104 after logging in to the subscription account application 150. This determination may be made based on a GPS location of the subscriber UE or the geofencing techniques described herein.

At block 409, method 400 comprises establishing, by the subscriber UE 102, a Wi-Fi direct connection 180 between the subscriber UE 102 and a ME UE 110 in the retail store 104 based on the subscriber credentials using the subscription account application 150. For example, the Wi-Fi direct connection 180 may be established by exchanging beacon frames and probe messages, as described above with reference to step 212 of method 200 in FIG. 2.

At block 412, the method 400 comprises transmitting, by the subscriber UE 102 to the ME UE 110 using the Wi-Fi direct connection 180, an authentication message 201 indicating an identity of a subscriber using the subscriber UE 102 and indicating that the subscriber is pre-registered with the TSP, triggering the subscriber to be added to a service queue 202 of the retail store 104. In an embodiment, the subscriber is added to the service queue 202 displayed on the queue display device 112, and the queue data 179 is updated to reflect the addition of the subscriber to the service queue 202.

Figure 5:
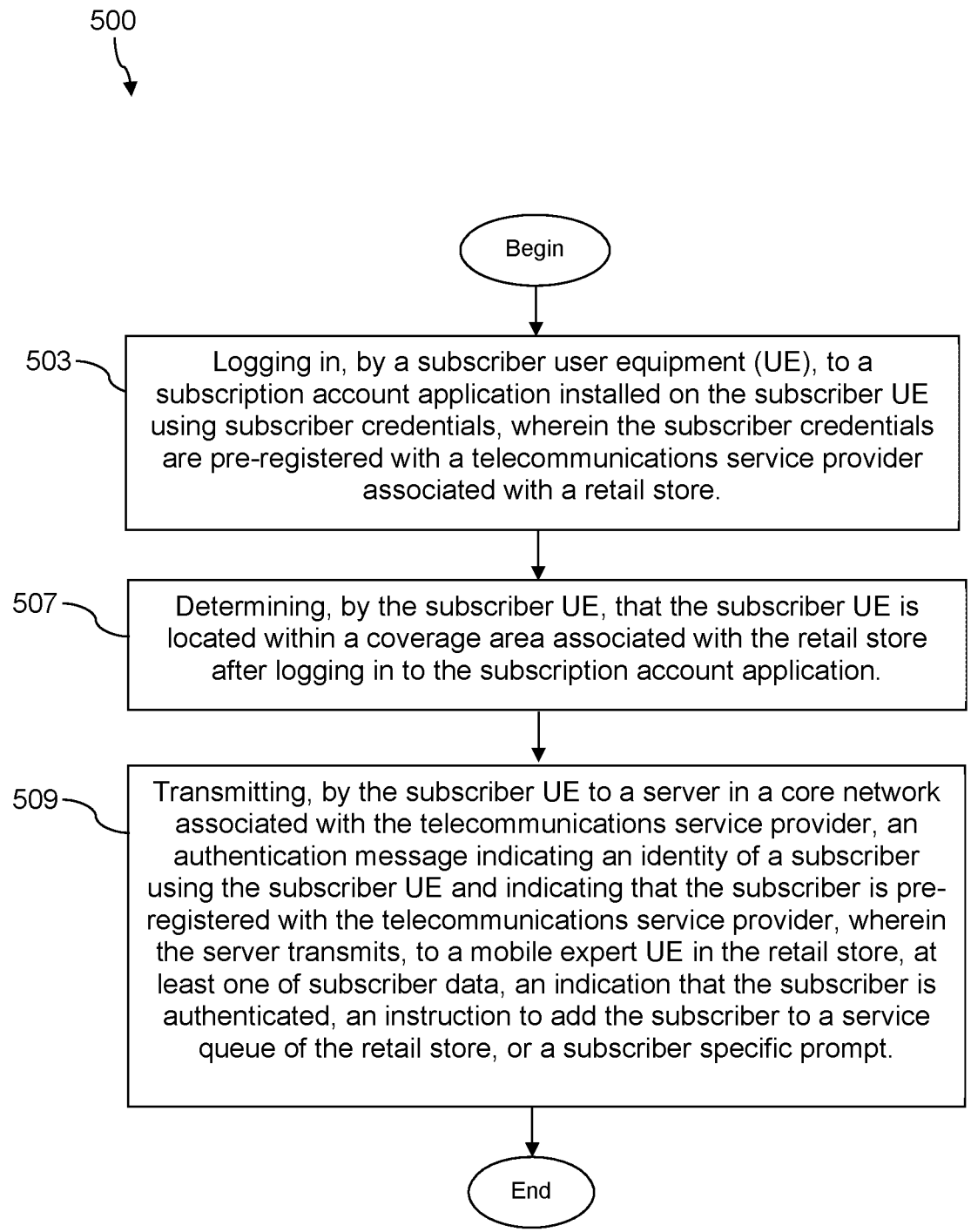
FIG. 5 is a flow chart of a second method performed by a subscriber user equipment (UE) in the communication system of FIG. 1 according to an embodiment of the disclosure

Turning now to FIG. 5, a method 500 is described. In an embodiment, the method 500 is a method for automatically authenticating the subscriber UE 102 with a ME UE 110 at a retail store 104 associated with a TSP. The method 400 may be performed by the subscriber UE 102 after the subscriber has registered the subscriber with the TSP (e.g., the server 117 and/or data store 119 in the core network 115). The method 400 corresponds to the second embodiment described above and with reference to the method 300 of FIG. 3.

At block 503, the method 503 comprises logging in, by the subscriber UE 102, to a subscription account application 150 installed on the subscriber UE 102 using subscriber credentials. In an embodiment, the subscriber credentials are pre-registered with the TSP associated with the retail store 104. In an embodiment, subscriber credentials may be pre-registered with the TSP when the subscriber credentials are stored in the subscriber data 176, at the data store 119 in the core network 115. Other credentials also associated with the subscriber and/or the subscriber UE may also be pre-registered with the TSP.

At block 507, the method 500 comprises determining, by the subscriber UE 102, that the subscriber UE 102 is located within a coverage area 106 associated with the retail store 104 after logging in to the subscription account application 150. This determination may be made based on a GPS location of the subscriber UE or the geofencing techniques described herein.

At block 509, method 500 comprises transmitting, by the subscriber UE 102 to a server 117 in a core network 115 associated with the TSP, an authentication message 201 indicating an identity of a subscriber using the subscriber UE 102 and indicating that the subscriber is pre-registered with the TSP. In an embodiment, the server 117 transmits, to a ME UE 110, at least one of subscriber data 176 describing the subscriber, an indication that the subscriber is authenticated, an instruction 301 to add the subscriber to a service queue 202 of the retail store 104, or a subscriber specific prompt 204.

Unlike step 412 of method 400 that uses the Wi-Fi direct connection 180 connection to transmit the authentication message 201 directly to the ME UE 110, step 509 of method 500 uses the cell site 126 and a data connection (e.g., an LTE connection) to transmit to the authentication to the server 117. The server 117 processes the authentication message 201 to obtain subscriber data 176 describing the subscriber and then authenticate the subscriber UE 102. The server 117 may also generate an instruction 301 to update the queue data 179 of the service queue 202 for the retail store 104, which is then used to update the service queue 202 displayed at the queue display device 112. Lastly, the server 117 may use the subscriber data 176 to determine subscriber specific prompts 204.

Figure 6:
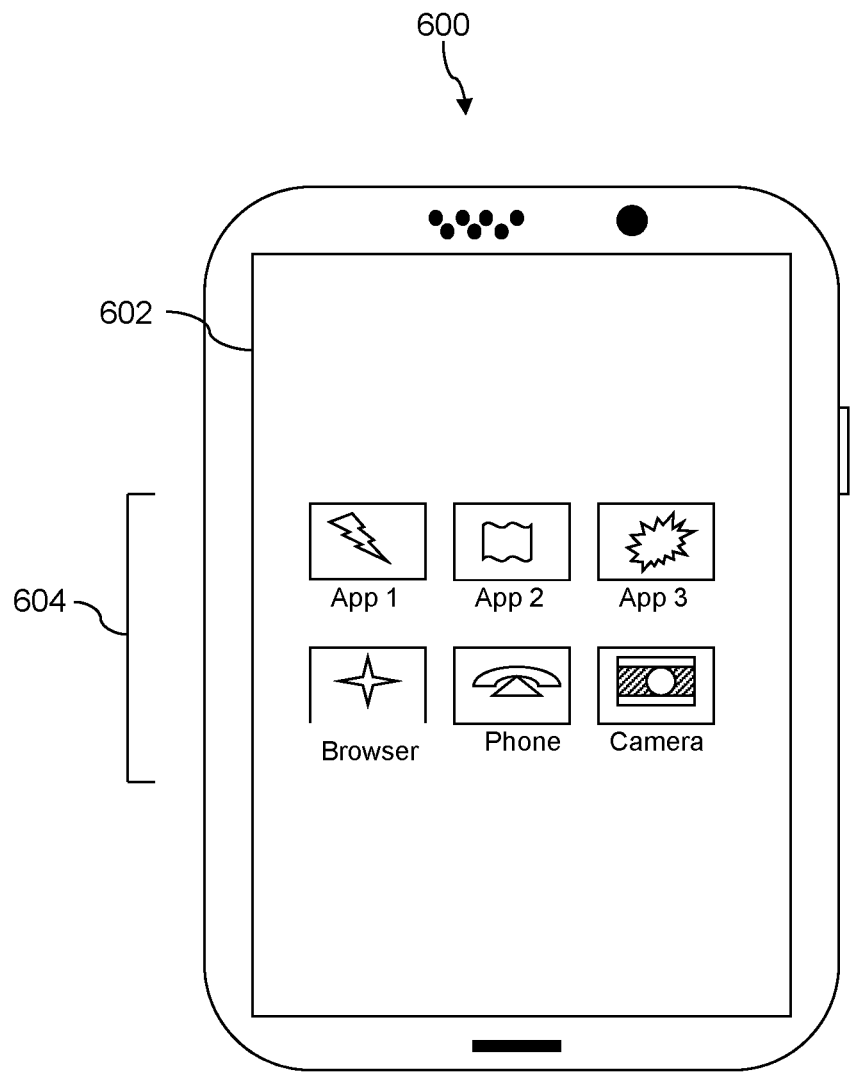
FIG. 6 is an illustration of a mobile communication device, such as the subscriber UE or the ME UE in the communications system of FIG. 1, according to an embodiment of the disclosure.

FIG. 6 depicts the user equipment (UE) 600, which is operable for implementing aspects of the present disclosure, but the present disclosure should not be limited to these implementations. In an embodiment, UEs 102 and 110 may be handsets similar to the UE 600. Though illustrated as a mobile phone, the UE 600 may take various forms including a wireless handset, a pager, a personal digital assistant (PDA), a gaming device, or a media player. The UE 600 includes a touchscreen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 602 to show a web page. The web page may be obtained via wireless communications with a base transceiver station, a wireless network access node, a peer UE 600 or any other wireless communication network or system.

Figure 7:
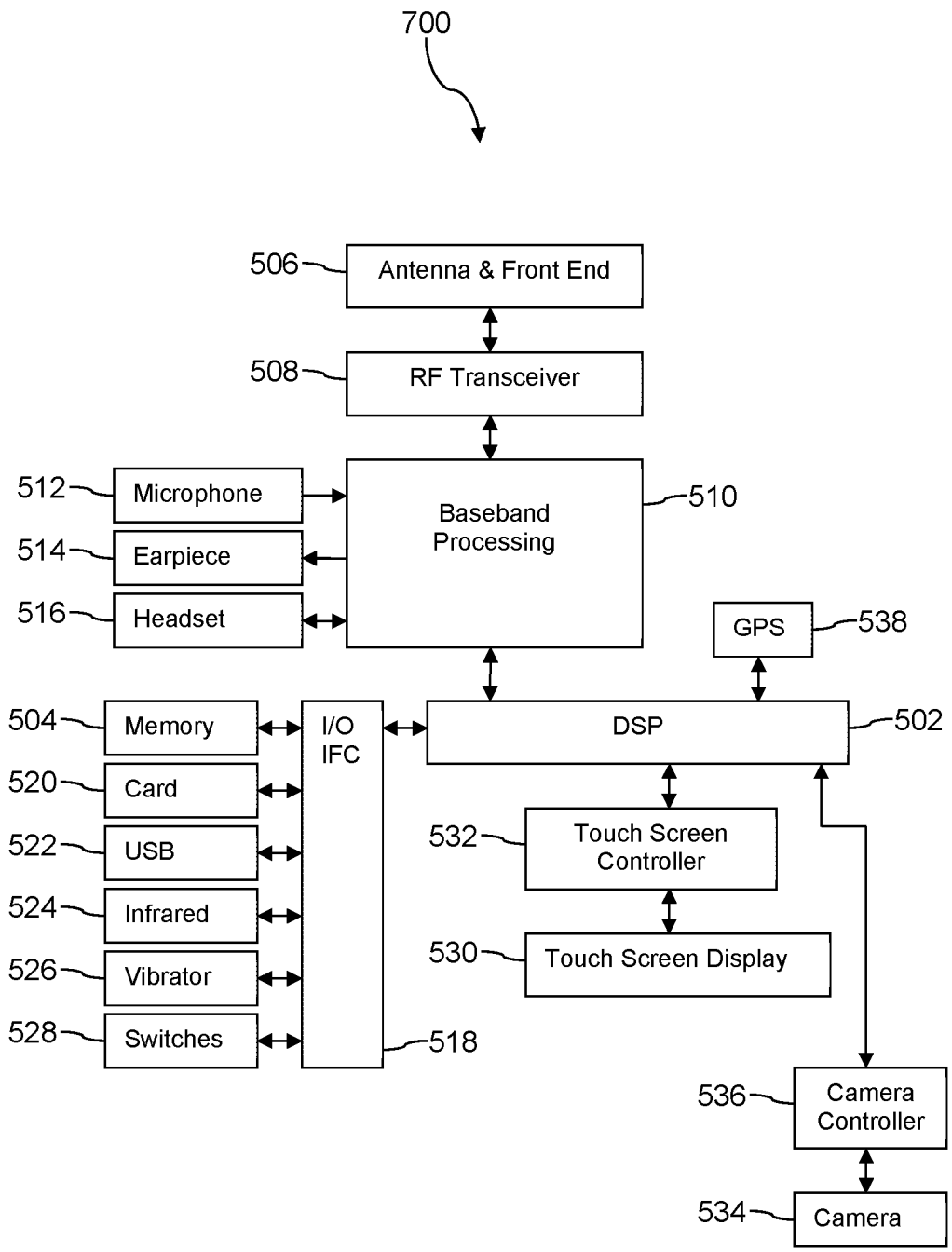
FIG. 7 is a block diagram of a hardware architecture of a mobile communication device according to an embodiment of the disclosure.

FIG. 7 shows a block diagram of the UE 700. In an embodiment, UEs 102 and 110 may be implemented on a hardware device, and include hardware components, similar to UE 700. While a variety of known components of handsets are depicted, in an embodiment a subset of the listed components and/or additional components not listed may be included in the UE 700. The UE 700 includes a digital signal processor (DSP) 502 and a memory 504. As shown, the UE 700 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 700 may include another kind of display that does not provide a touch sensitive screen. In an embodiment, the UE 700 may include both the touch screen display 530 and additional display component that does not provide a touch sensitive screen. In an embodiment, the DSP 502 may communicate directly with the memory 504 without passing through the input/output interface 518. Additionally, in an embodiment, the UE 700 may comprise other peripheral devices that provide other functionality.

The DSP 502 or some other form of controller or central processing unit operates to control the various components of the UE 700 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 700 to function as a peripheral device to exchange information with a personal computer or other computer system. The infrared port 524 and other optional ports such as a Bluetooth® interface or an IEEE 802.11 compliant wireless interface may enable the UE 700 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 700 may comprise a radio frequency identify (RFID) reader and/or writer device.

The switches 528 may couple to the DSP 502 via the input/output interface 518 to provide one mechanism for the user to provide input to the UE 700. Alternatively, one or more of the switches 528 may be coupled to a motherboard of the UE 700 and/or to components of the UE 700 via a different path (e.g., not via the input/output interface 518), for example coupled to a power control circuit (power button) of the UE 700. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 700 to determine its position.

Figure 8A:
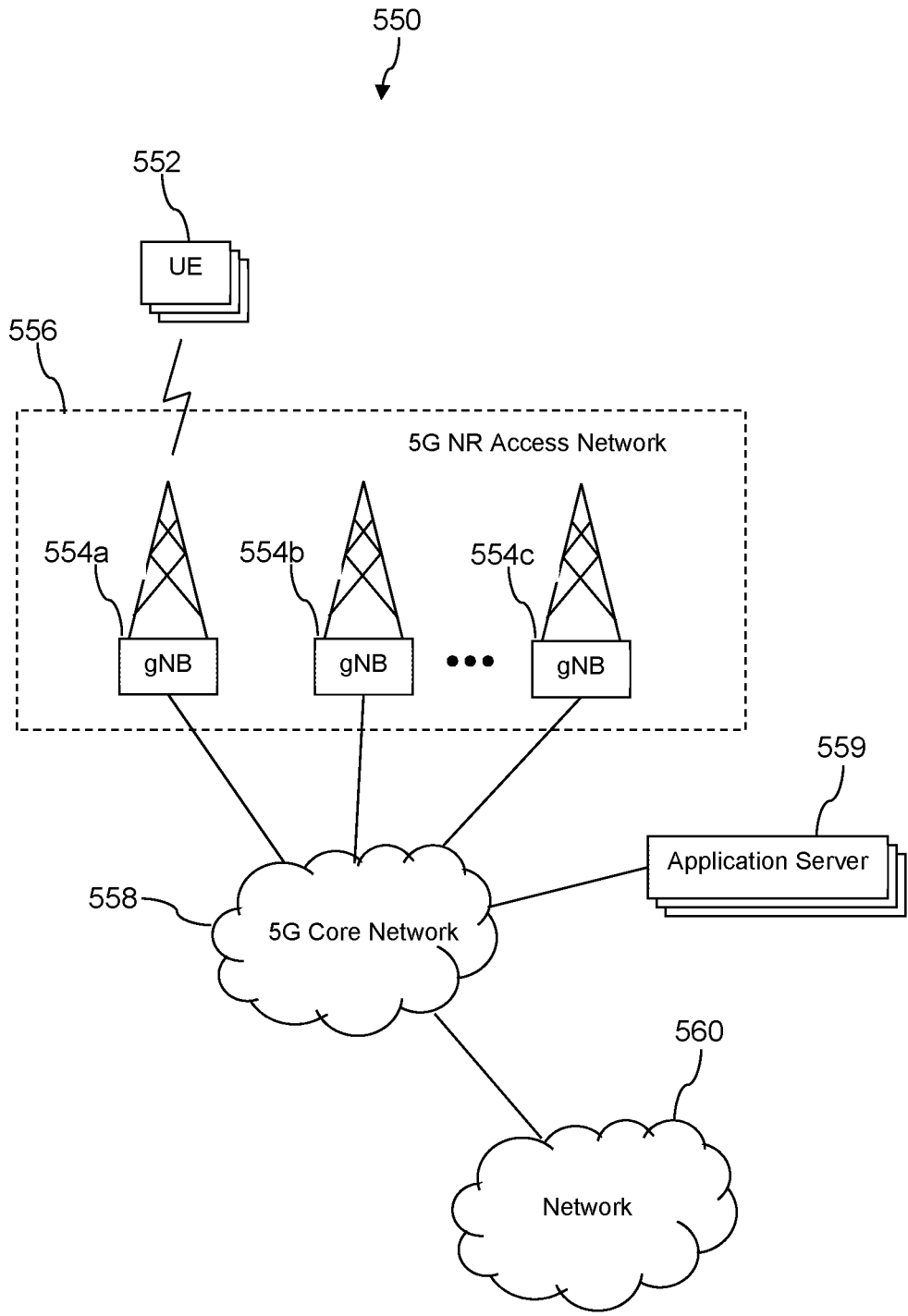
FIGS. 8A-B are block diagrams illustrating a communication system similar to the communication system of FIG. 1 according to an embodiment of the disclosure.

Turning now to FIG. 8A, an exemplary communication system 550 is described. In an embodiment, the communication system 550 may be implemented in the system 100 of FIG. 1. The communication system 550 includes a number of access nodes 554 that are configured to provide coverage in which UEs 552 (e.g., subscriber UE 102 and ME UE 110) such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 8B:
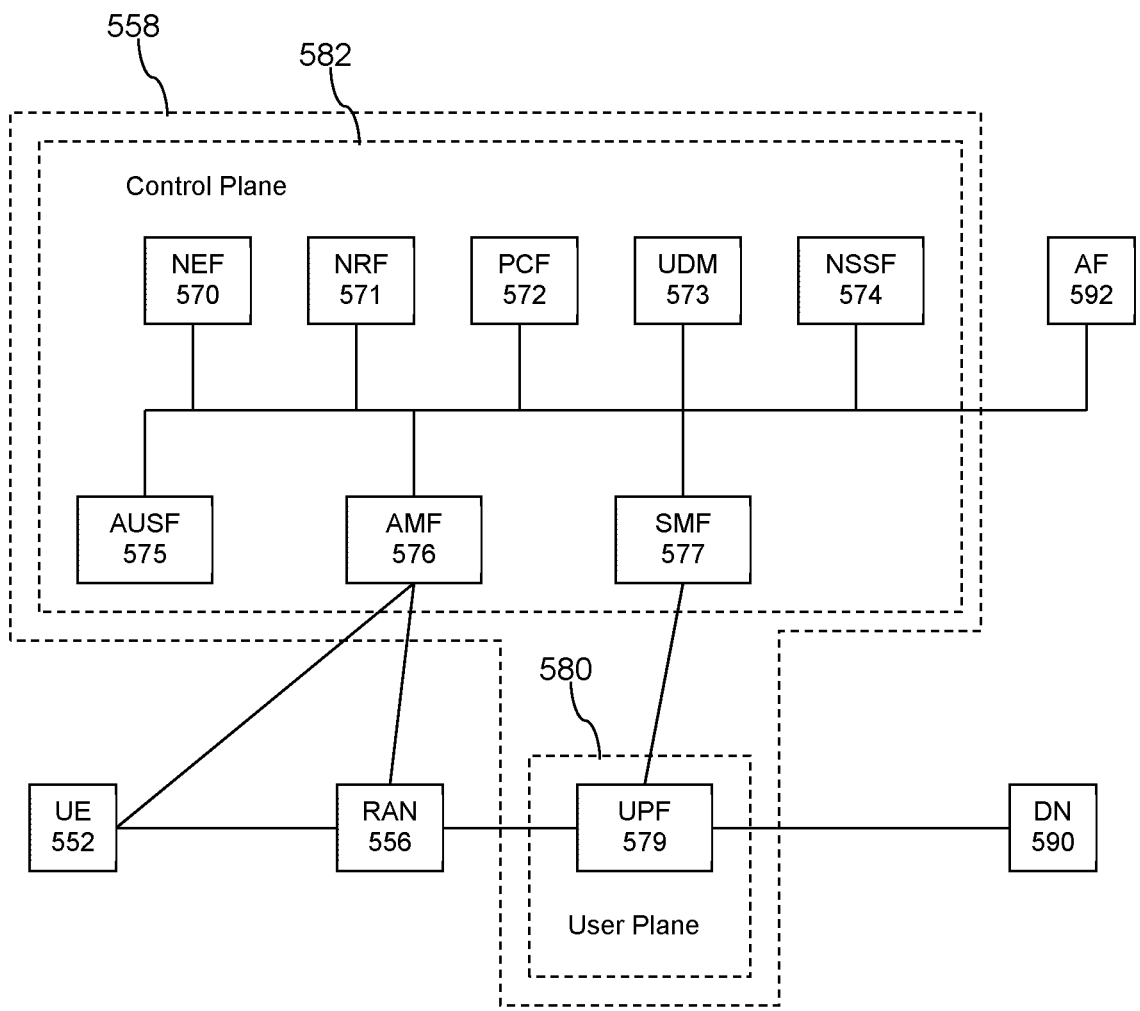

Turning now to FIG. 8B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 8A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 9:
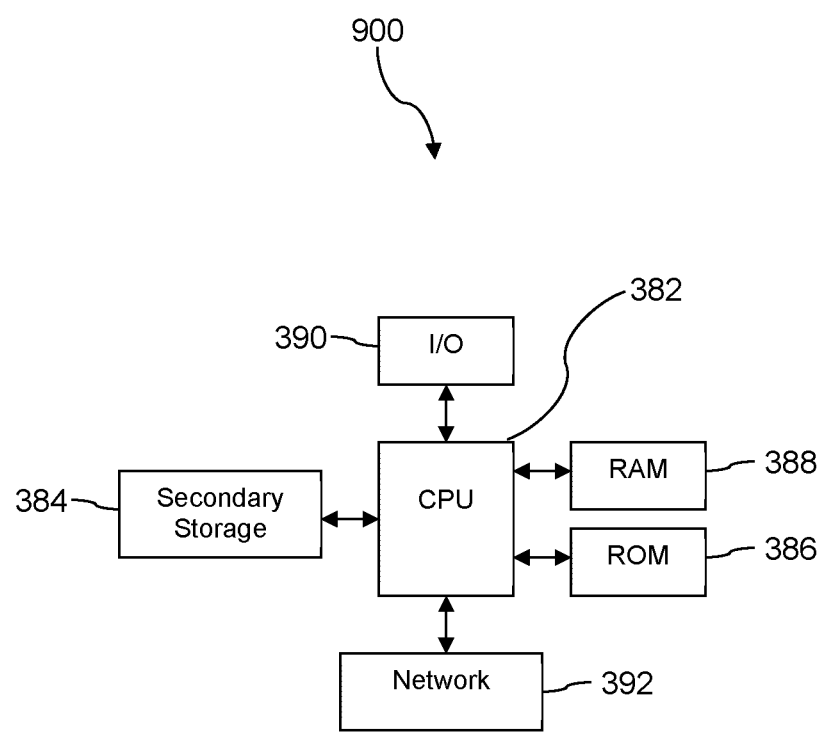
FIG. 9 is a block diagram of a computer system implemented within the communication system of FIG. 1 or FIGS. 8A-B according to an embodiment of the disclosure.

FIG. 9 illustrates a computer system 900 suitable for implementing one or more embodiments disclosed herein. In an embodiment, the subscriber UE 102, the ME UE 110, and server 117 may be implemented as the computer system 900. The computer system 900 includes a processor 382 (which may be referred to as a central processor unit or CPU) that is in communication with memory devices (e.g., non-transitory memory 131 including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 900, at least one of the CPU 382, the RAM 388, and the ROM 386 are changed, transforming the computer system 900 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), Wi-Fi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 900 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 900 to provide the functionality of a number of servers that is not directly bound to the number of computers in the computer system 900. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 900, at least portions of the contents of the computer program product to the secondary storage 384, to the ROM 386, to the RAM 388, and/or to other non-volatile memory and volatile memory of the computer system 900. The processor 382 may process the executable instructions and/or data structures in part by directly accessing the computer program product, for example by reading from a CD-ROM disk inserted into a disk drive peripheral of the computer system 900. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 900.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 900 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A wireless communications system, comprising:
a subscriber user equipment comprising:
a first non-transitory memory configured to store first instructions; and
a first processor coupled to memory and configured to execute the first instructions, which cause the first processor to be configured to:
log in to a subscription account application installed on the subscriber user equipment using subscriber credentials, wherein the subscriber credentials are pre-registered with a telecommunications service provider associated with a retail store;
determine that the subscriber user equipment is located within a coverage area associated with the retail store after logging in to the subscription account application; and
transmit an authentication message indicating an identity of a subscriber using the subscriber user equipment and indicating that the subscriber is pre-registered with the telecommunications service provider; and
a mobile expert user equipment coupled to the subscriber user equipment, wherein
the mobile expert user equipment comprises:
a second non-transitory memory configured to store second instructions; and
a second processor coupled to memory and configured to execute the second instructions, which cause the second processor to be configured to:
obtain subscriber data describing a subscriber associated with the subscriber user equipment after the subscriber user equipment transmits the authentication message;
transmit, to a queue display device in the wireless communication system an instruction to add the subscriber to a service queue of the retail store; and
display, on a user interface of the mobile expert user equipment, at least one of the subscriber data and a subscriber specific prompt.

2. The wireless communications system of claim 1, wherein the authentication message is transmitted to the mobile expert user equipment using a Wi-Fi direct connection established between the subscriber user equipment and the mobile expert user equipment.

3. The wireless communications system of claim 2, wherein the first instructions further cause the first processor of the subscriber user equipment to be configured to exchange a beacon frame, a probe request, and a probe response with the mobile expert user equipment, and wherein the probe request and the probe response comprises an identifier of the subscriber user equipment.

4. The wireless communications system of claim 2, wherein the coverage area is associated with a geofence, and wherein, when the subscriber user equipment enters the coverage area, the first instructions further cause the first processor to trigger transmission of the authentication message to the mobile expert user equipment using the Wi-Fi direct connection.

5. The wireless communications system of claim 1, further comprising:

a server located in a core network and coupled to both the subscriber user equipment and the mobile expert user equipment, wherein the server is configured to:
  receive the authentication message from the subscriber user equipment;
  obtain the subscriber data from a data store coupled to the server;
  generate the indication that the subscriber is authenticated, the instruction to add the subscriber to the service queue of the retail store, and the subscriber specific prompt; and
  transmit, to the mobile expert user equipment, at least one of the subscriber data, the indication that the subscriber is authenticated, the instruction to add the subscriber to the service queue of the retail store, or the subscriber specific prompt.

6. The wireless communications system of claim 1, wherein the second instructions further cause the second processor of the mobile expert user equipment to be configured to:
  receive the subscriber data from a server located in a core network; and
  determine the subscriber specific prompt based on the subscriber data, and wherein the subscriber data comprises account data, service history data, and usage data.

7. The wireless communications system of claim 1, wherein the authentication message comprises at least one of the subscriber credentials, an identifier of the subscriber user equipment, an account number associated with the subscriber user equipment, personally identifying information (PII) identifying the subscriber, or a flag indicating that the indicating that the subscriber credentials are stored in association with the subscriber at a data store associated with the telecommunications service provider.

8. The wireless communications system of claim 1, wherein the first instructions further cause the first processor of the subscriber user equipment to be configured to determine whether a Global Positioning System (GPS) location of the subscriber user equipment is within a location of the coverage area stored in a memory of the subscriber user equipment.

9. The wireless communications system of claim 1, wherein the second instructions further cause the second processor of the mobile expert user equipment to be configured to receive, from a server in a core network, at least one of the subscriber data, the indication that the subscriber is authenticated, the instruction to add the subscriber to the service queue of the retail store, or the subscriber specific prompt.

10. A method performed by a subscriber user equipment for automatically authenticating the subscriber user equipment with a mobile expert user equipment at retail store associated with a telecommunications service provider, wherein the method comprises:
  logging in, by the subscriber user equipment, to a subscription account application installed on the subscriber user equipment using subscriber credentials, wherein the subscriber credentials are pre-registered with the telecommunications service provider associated with the retail store;
  determining, by subscription account application executing on the subscriber user equipment, that the subscriber user equipment is located within a coverage area associated with the retail store after logging in to the subscription account application;
  establishing, using a Wi-Fi direct application programming interface (API) of the subscriber user equipment, a Wi-Fi direct connection between the subscriber user equipment and a mobile expert user equipment in the retail store based on the subscriber credentials using the subscription account application, wherein the Wi-Fi direct connection enables the subscriber user equipment to communicate directly with the mobile user equipment; and
  transmitting, using the Wi-Fi direct API of the subscriber user equipment and the Wi-Fi direct connection, directly to the mobile expert user equipment, an authentication message indicating an identity of a subscriber using the subscriber user equipment and indicating that the subscriber is pre-registered with the telecommunications service provider, triggering the subscriber to be added to a service queue of the retail store.

11. The method of claim 10, wherein the coverage area is associated with a geofence, and wherein, when the subscriber user equipment enters the coverage area, the method further comprises triggering, by the subscriber user equipment, transmission of the authentication message to the mobile expert user equipment using the Wi-Fi direct connection.

12. The method of claim 10, wherein determining, by the subscriber user equipment, that the subscriber user equipment is located within a coverage area comprises determining whether a Global Positioning System (GPS) location of the subscriber user equipment is within a location of the coverage area stored in a memory of the subscriber user equipment.

13. The method of claim 10, wherein establishing the Wi-Fi direct connection between the subscriber user equipment and the mobile expert user equipment comprises exchanging a beacon frame, a probe request, and a probe response with the mobile expert user equipment, and wherein the probe request and the probe response comprises an identifier of the subscriber user equipment.

14. The method of claim 13, wherein the authentication message comprises at least one of the subscriber credentials, an identifier of the subscriber user equipment, an account number associated with the subscriber user equipment, personally identifying information (PII) identifying the subscriber, or a flag indicating that the indicating that the subscriber credentials are stored in association with the subscriber at a data store associated with the telecommunications service provider.

15. The method of claim 10, further comprising
  determining, by the subscriber user equipment, an updated position of the subscriber user equipment in the coverage area using at least one of a Wi-Fi connection to a wireless local area network (WLAN), a Long Term Evolution (LTE), BLUETOOTH beacons, or Global Positioning System (GPS) receivers; and
  transmitting, by the subscriber user equipment, the updated position to the mobile expert user equipment using the Wi-Fi direct connection.

16. A subscriber user equipment for automatically authenticating the subscriber user equipment with a retail store associated with a telecommunications service provider, wherein the subscriber user equipment comprises:
  a user equipment server application programming interface (API);
  a non-transitory memory configured to store instructions; and a processor coupled to memory and configured to execute the instructions, which cause the processor to be configured to:
- log in to a subscription account application installed on the subscriber user equipment using subscriber credentials, wherein the subscriber credentials are pre-registered with the telecommunications service provider associated with the retail store;
- determine, by the subscription account application, that the subscriber user equipment is located within a coverage area associated with the retail store after logging in to the subscription account application; and
- transmit, using the user equipment server API, to a server in a core network associated with the telecommunications service provider, an authentication message indicating an identity of a subscriber using the subscriber user equipment and indicating that the subscriber is pre-registered with the telecommunications service provider, wherein the server transmits, to a mobile expert user equipment in the retail store, at least one of subscriber data describing the subscriber, an indication that the subscriber is authenticated, an instruction to add the subscriber to a service queue of the retail store, or a subscriber specific prompt.

17. The subscriber user equipment of claim 16, wherein the coverage area is associated with a geofence, and wherein, when the subscriber user equipment enters the coverage area, the instructions further cause the processor to be configured to trigger transmission of the authentication message to the server in the core network.

18. The subscriber user equipment of claim 16, wherein the instructions further cause the processor to be configured to determine whether a Global Positioning System (GPS) location of the subscriber user equipment is within a location of the coverage area stored in a memory of the subscriber user equipment.

19. The subscriber user equipment of claim 16, wherein the subscriber specific prompt is determined based on the subscriber data, and wherein the subscriber data comprises account data, service history data, and usage data.

20. The subscriber user equipment of claim 16, wherein the authentication message comprises at least one of the subscriber credentials, an identifier of the subscriber user equipment, an account number associated with the subscriber user equipment, personally identifying information (PII) identifying the subscriber, or a flag indicating that the indicating that the subscriber credentials are stored in association with the subscriber at a data store associated with the telecommunications service provider.

* * * * *